United States Patent [19]

Poirier et al.

[11] Patent Number: 5,350,157
[45] Date of Patent: Sep. 27, 1994

[54] METHOD FOR LINING A CONTINUOUS CASTING DISTRIBUTOR WITH A REFRACTORY MATERIAL, DISTRIBUTOR AND REFRACTORY MATERIAL RESULTING FROM SAID METHOD

[75] Inventors: Jacques Poirier, Dunkerque; Gilbert Provost, Les Breviaires; Jean Martin; Jean Rozieres, both of Metz, all of France

[73] Assignees: Sollac, Puteaux; Le Laboratoire Metallurgique, Woippy, both of France

[21] Appl. No.: 966,464

[22] Filed: Oct. 26, 1992

[30] Foreign Application Priority Data

Nov. 4, 1991 [FR] France .................. 91 13721

[51] Int. Cl.$^5$ .................. B22D 41/02; C04B 35/66
[52] U.S. Cl. .................. 266/44; 266/280; 264/30; 501/108
[58] Field of Search .................. 264/30; 266/275, 280, 266/44; 501/108

[56] References Cited

U.S. PATENT DOCUMENTS

| | | | |
|---|---|---|---|
| 4,001,029 | 1/1977 | Cassens, Jr. | 266/280 |
| 4,681,863 | 7/1987 | Yamamoto et al. | 501/108 |
| 4,802,425 | 2/1989 | Dickson | 266/280 |
| 4,931,415 | 6/1990 | Neudeck et al. | 266/275 |
| 5,188,794 | 2/1993 | Daussan et al. | 266/280 |

FOREIGN PATENT DOCUMENTS

| | | |
|---|---|---|
| 0253957 | 1/1988 | European Pat. Off. |
| 0260322 | 3/1988 | European Pat. Off. |
| WO90/09970 | 9/1990 | PCT Int'l Appl. |

*Primary Examiner*—Scott Kastler
*Attorney, Agent, or Firm*—Oblon, Spivak, McClelland, Maier & Neustadt

[57] ABSTRACT

Method for lining a distributor for the continuous casting of metals, in particular steel, comprising preparing material for constituting a wear-resistant refractory lining of the distributor with raw natural dolomite, or raw natural calcite, or a mixture of these two materials, which are chosen with a particle size of between 0 and 5 mm, incorporating in this raw material a binder in proportions of 0.4 to 5% by weight and a mineral or organic plasticizer in proportions of 0.2 to 3% by weight and, after the lining has been placed in position on the distributor in the aqueous form, proceeding to the decarbonation of this lining in the course of its drying and baking, characterized in that the method further comprises incorporating in the material of the lining at least one compound having the property of shrinking at temperatures lower than about 700° C. This compound is preferably a hydroxide of an alcaline earth metal or a mixture of such hydroxides incorporated in the lining material in the proportion of 5 to 20%. The invention also provides a lining for a distributor and a distributor provided with this lining.

8 Claims, No Drawings

METHOD FOR LINING A CONTINUOUS CASTING DISTRIBUTOR WITH A REFRACTORY MATERIAL, DISTRIBUTOR AND REFRACTORY MATERIAL RESULTING FROM SAID METHOD

The present invention relates to the field of the continuous casting of metals, in particular steel. It concerns more particularly distributors or tundishes, and more especially their wear-resistant refractory lining intended to be in direct contact with the liquid metal during the casting.

The wear-resistant refractory lining of a continuous steel-casting distributor is at the present time applied in the aqueous form on a permanent undercoat, most generally of dense refractory concrete, by various techniques such as spraying, trowelling, pouring/vibration or tamping. This lining is then dried before use of the distributor.

Magnesia is the material most commonly employed for this purpose, in particular owing to its low reactivity with respect to highly deoxidizing elements, such as aluminium or calcium, contained in the liquid steel. However, the magnesian linings usually employed always have a non-negligible content of silica (5 to 15%). Now, the reduction of the silica by highly deoxidizing elements results in the formation of non-metallic inclusions which pollute the metal. Consequently, the part of the lining which is in contact with the liquid metal must have a silica content which is as low as possible when a highly clean condition as concerns inclusions is required of the cast product. The use of magnesia of higher purity is possible, but this substantially increases the cost of the lining.

Another drawback of magnesia is its high apparent volumic mass which has an unfavourable action on the thermal insulation properties of the lining. Even in cases where the lining is lightened by incorporation of various fibers, its volumic mass remains of the order of 1600 to 1800 kg/m$^3$.

The applicant proposed in the document WO 90/09970 using a refractory lining based on raw natural dolomite $MgCO_3$—$CaCO_3$, or raw natural calcite $CaCO_3$, or a mixture of these two compounds. The lining is first of all applied in the aqueous form against the permanent refractory undercoat by one of the aforementioned conventional techniques. Then it is heated to a temperature which must reach between 800° and 950° C. within the lining so as to dry the lining and above all achieve its decarbonation in situ. This provides a lining based on CaO or CaO—MgO having a density lower than 1500 kg/m$^3$, which imparts thereto very satisfactory insulating properties. Further, owing to the low contents of silica, alumina and iron oxides of the raw dolomite and raw calcite, this lining exhibits a high chemical inertia with respect to the liquid steel.

The particle size of the raw dolomite and raw calcite is between 0 and 5 mm. They are mixed with a binder and a mineral or organic plasticizer in the respective proportions of 0.5 to 5% and 0.2 to 3% by weight.

This lining method is fully satisfactory for small distributors. However, when it is applied to distributors having a capacity of several tens of tons of liquid metal, such as those employed on recent large continuous casting machines, it has been observed that, when heated, this lining comes away from the surface on which it has been applied, owing to its expansion. This separation of the lining renders it useless.

An object of the invention is avoid this separation and thereby render possible the use of a lining of decarbonated raw dolomite or calcite even on large distributors.

The invention therefore provides a method for lining a distributor for the continuous casting of metals, in particular steel, which comprises preparing the constituent material of the wear-resistant refractory lining of said distributor with raw natural dolomite, or raw natural calcite, or a mixture of these two materials, which are chosen with a particle size of between 0 and 5 mm, incorporating in said raw material a binder in proportions of 0.4 to 5% by weight and a mineral or organic plasticizer in proportions of 0.2 to 3% by weight, and, after the lining has been placed on the distributor in the aqueous form, proceeding to the decarbonation of said lining in the course of its drying and baking, characterized in that the method further comprises incorporating in said lining material at least one compound having the property of shrinking at temperatures below about 700° C.

In one embodiment, this compound having the shrinkage property is a hydroxide of an alkaline earth metal or a mixture of such hydroxides incorporated in the material of said lining in the proportion of 5 to 20% by weight.

The invention also provides a distributor lining resulting from the application of this method, and a distributor lined with said lining.

As will have been understood, the invention comprises incorporating in the lining a compound which will produce, in the course of the drying-decarbonation stage, a shrinkage adapted to compensate, by anticipation, for the expansion which is usually the cause of the separation of the lining.

A better understanding of the invention will be had from the following description.

As already explained, after the lining based on raw dolomite or raw calcite has been applied, a heating stage follows. The purpose of this stage is to dry the lining which, it will be recalled, was applied in the aqueous form, and above all to cause the decarbonation of the dolomite and/or calcite. Thus the $CaCO_3$ is converted into CaO and the $MgCO_3$ is converted into MgO. The hollows created in this way in the lining result in a final density which is lower than 1500 kg/m$^3$, and preferably between 1100 and 1400 kg/m$^3$, as compared to the 2800 kg/m$^3$ of raw natural dolomite, and the 1600–1800 kg/m$^3$ of the usual magnesian linings. The minimum temperature to be reached within the lining for a total decarbonation is 950° C., which implies reaching a surface temperature of over 1200° C. Such a heating results in a marked expansion which is the cause of stresses within the lining. These stresses are more particularly concentrated in the median zone of the walls of the distributor and they may result in a separation of the lining in the case of distributors whose large walls reach several meters in length.

According to the invention, a solution to this problem consists in incorporating in the lining a compound or compounds which have the property of shrinking when heated and become decomposed. This contraction or shrinkage must occur at a temperature lower than that at which a risk of separation of the lining begins. Conventionally, the last-mentioned temperature is of the order of 700° C. If this shrinkage occurs before the separation can begin, it corresponds to an anticipated compensation for at least a part of the expansion that the lining has already undergone and will undergo during the steps subsequent to the heating. Thus, the deformation of the lining in the course of heating is substantially reduced, which avoids risk of separation if the compound or compounds causing the shrinkage and their content in the lining have been suitably chosen.

Such compounds are to be selected, for example, from the hydroxides which have the property of decomposing at temperatures below 700° C. The hydroxides of alkaline earth metals, such as the calcium hydroxides Ca(OH)$_2$ and the magnesium hydroxides Mg(OH)$_2$, alone or mixed in any proportions, are particularly adaptable to this use, since their decomposition occurs essentially between 350° and 500° C. Moreover, this decomposition produces a sufficient shrinkage to compensate for the expansion of the lining in the subsequent stages of the heating when these hydroxides are present in the proportion of 5 to 20% of the total amount (these contents and all the contents which will follow are given in percentages by weight in the material which has not yet been put into the aqueous form and is intended to constitute the lining). Lastly, this decomposition produces, in addition to the water which evaporates, lime and/or magnesia, i.e. the essential constituents of the lining in its final form adapted to receive the liquid metal. A lining is in this way provided which is perfectly stable throughout its heating, irrespective of the size of the surface on which it is applied. The density and the other physical properties of this lining are very substantially the same as those of the lining of the prior art.

These hydroxides are ordinary common products and the cost of the lining is hardly affected.

Apart from the raw dolomite and/or the raw calcite and the calcium and/or magnesium hydroxides, in the proportion of 5 to 20%, the material intended to constitute the lining according to the invention includes the same components as the material of the linings described in the aforementioned document WO 90/09970, namely:

a conventional binder, such as sodium silicate in the proportion of 0.4 to 5%;

and a mineral plasticizer, such as clay, or an organic plasticizer in the proportion of 0.2 to 3% to prevent migration of the binder in the course of the drying.

The size of the particles of raw dolomite and/or raw calcite is less than 5 mm, and preferably less than 1 mm. In the last case, it is recommended that 15 to 40% of the particles have a particle size of less than 0.1 mm.

It will be understood that other compounds having shrinkage properties comparable to those of the calcium and magnesium hydroxides may be employed, provided their decomposition does not give rise to a compound liable to result in pollution of the liquid metal. Their contents must be adapted in accordance with their intrinsic shrinkage properties and with the extent of the shrinkage that they must produce.

In the known manner in conventional linings, there may also be added to these materials a mineralizing agent or mineralizing agents, such as compounds of boron or alkali metal chlorides in proportions which do not exceed a total of 5% by weight. They have for effect to reduce the friability of the lining after its application. As these products are decomposed when the lining is baked, they cannot constitute a source of pollution of the metal.

As an example, a possible composition for a lining according to the invention is:
  dolomite 88%
  clay 0.5%
  sodium silicate 1%
  organic fibers 0.2%
  calcium hydroxide 10%.

Another possible composition is:
  calcite 92%
  clay 0.5%
  sodium silicate 1%
  organic fibers 0.2%
  mineral fibers 0.5%
  calcium hydroxide 5%
  colemanite (3 B$_2$O$_2$, 2 CaO, 5 H$_2$O) 0.5%.

As before, the contents of these components are given in percentages by weight in a material which is intended to constitute the lining but has not yet been put into the aqueous form.

What is claimed is:

1. A method for lining a distributor for the continuous casting of metals comprising the steps of:
   preparing a wear-resistant refractory lining material for said distributor comprising a material selected from the group consisting of raw natural dolomite, raw natural calcite, and a mixture thereof, choosing for said selected raw material a particle size of between 0 and 5 mm,
   adding to said selected raw material a binder in a proportion of 0.4 to 5% by weight and a plasticizer in a proportion of 0.2 to 3% by weight,
   putting said lining material in an aqueous form and putting it in position in said distributor, thereafter drying and baking said lining material, decarbonating said lining material in the course of said drying and baking,
   said method further comprising adding to said lining material at least a compound different from said binder and plasticizer and having a property of shrinking at temperatures below about 700° C.

2. The method according to claim 1, wherein said plasticizer is a mineral plasticizer.

3. The method according to claim 1, wherein said plasticizer is an organic plasticizer.

4. A method for lining a distributor for the continuous casting of metals comprising the steps of:
   preparing a wear-resistant refractory lining material for said distributor comprising a material selected from the group consisting of raw natural dolomite, raw natural calcite, and a mixture thereof, choosing for said selected raw material a particle size of between 0 and 5 mm,
   adding to said selected raw material a binder in a proportion of 0.4 to 5% by weight and a plasticizer in a proportion of 0.2 to 3% by weight,
   putting said lining material in an aqueous form and putting it in position in said distributor, thereafter drying and baking said lining material, decarbonating said lining material in the course of said drying and baking,
   said method further comprising adding to said lining material at least a compound having a property of shrinking at temperatures below about 700° selected from the group consisting of a hydroxide of an alkaline earth metal and a mixture of said hydroxides in a proportion of 5 to 20% by weight.

5. The method according to claim 1, wherein said particle size is between 0 and 1 mm.

6. The method according to claim 1, comprising choosing sodium silicate as said binder.

7. The method according to claim 1, comprising choosing clay as said plasticizer.

8. The method according to claim 1, wherein said distributor is a distributor for the continuous casting of steel.

* * * * *

UNITED STATES PATENT AND TRADEMARK OFFICE
CERTIFICATE OF CORRECTION

PATENT NO.   : 5,350,157
DATED        : September 27, 1994
INVENTOR(S)  : Jacques POIRIER, et al.

It is certified that error appears in the above-indentified patent and that said Letters Patent is hereby corrected as shown below:

On the title page, Item [75], the fourth inventor's name should read:

--Jean Roziere--

Signed and Sealed this

Thirteenth Day of December, 1994

Attest:

BRUCE LEHMAN

Attesting Officer    Commissioner of Patents and Trademarks